MEANS FOR ALTERING TELEPHONE OPERATION

Filed Feb. 25, 1959 3 Sheets-Sheet 1

INVENTORS.
CARL O. FRIEND
ROBERT R. BELL
BY Parker & Carter
ATTORNEYS.

March 24, 1964 C. O. FRIEND ETAL 3,126,453

MEANS FOR ALTERING TELEPHONE OPERATION

Filed Feb. 25, 1959 3 Sheets-Sheet 2

INVENTORS.
CARL O. FRIEND
ROBERT R. BELL
BY Parker & Carter
ATTORNEYS.

INVENTORS.
CARL O. FRIEND
ROBERT R. BELL
BY Parker & Carter
ATTORNEYS.

3,126,453

MEANS FOR ALTERING TELEPHONE OPERATION

Carl O. Friend, 606 W. Wisconsin Ave., Milwaukee 3, Wis., and Robert R. Bell, 3073 S. Chase Ave., Milwaukee 1, Wis.

Filed Feb. 25, 1959, Ser. No. 799,833
4 Claims. (Cl. 179—89)

Our invention relates to a new novel means for altering the operation of telephones to thereby increase their effectiveness. This application is a continuation-in-part of application Serial No. 748,259, filed July 14, 1958, now Patent No. 3,033,941.

The telephone today has become virtually a necessity as a means of communication, particularly in business and industry. The usual manner of signaling the person called or call-receiver frequently becomes an intrusion of privacy and busy people such as business executives may wish that they could eliminate all but truly essential telephone calls. To entrust this matter to the discretion of another person such as a secretary is not always satisfactory however. Frequently, the person initiating the telephone call (call-initiator) is capable of making a determination as to whether under given circumstances, the answering of his call would be regarded as essential.

Our system permits the person receiving the call (call-receiver) to alter at will the normal signaling of his telephone so that, while so altered, he will receive no calling signals such as the conventional ringing bell, but instead will receive a signal only if the call-initiator decides that the message is truly important enough to warrant an interruption. While the call-receiver's telephone is so altered, the call-initiator will hear (over and above the conventional sound of the ringing signal) a special and distinctive tone signal indicating that the call-receiver is "temporarily unavailable" and does not wish to be intruded upon unless it is absolutely essential. If the call-initiator decides that interruption is nevertheless warranted, he allows the usual ringing signal (with the added distinctive tone signal) to continue through the duration of a preset interval of time—e.g., approximately 30 to 45 seconds, or 5 to 7 ringing pulses—at which time the signaling circuit of the call-receiver is automatically restored and is actuated by the continuing ringing signal. If, on the other hand, the call-initiator decides that the urgency of his message does not warrant breaking in to the privacy desired by the call-receiver, the call-initiator may discontinue his call after hearing the distinctive tone signal and the first few ringing pulses; this will stop the ringing signal (which is actually inaudibile to the call-receiver during the preset interval) and the call-receiver will not have been disturbed.

With our device, telephones may be altered in such a manner that busy people are permitted to work without undesired interruptions, but at the same time are able to receive essential incoming calls. This may be particularly advantageous for example, when the call-receiver is engaged in a conference discussion or a confidential discussion. Our device also eliminates the inconvenience to others, as well as to the call-initiator, caused by the absence of a secretary who may be away from her desk for a variety of reasons, substituting therefore automatic and instantaneous means for notifying the call-initiator that the timing of his call is at least inconvenient. In other words, the call-initiator need not keep trying the call with consequent demands on the time of other persons because he is informed quickly and automatically that the call-receiver does not wish to be disturbed at that particular time.

Some of the above mentioned advantages would be of immediate benefit upon installation of the system in existing circuits. With the passing of time and the familiarity acquired through use of the system, even greater advantages would accrue. For example, repeated use of circuits embodying our device would induce brevity of conversations because repeated calls by a call-initiator to a call-receiver having a telephone equipped with our system would tend to indicate the relative activity at the call-receiving end of the line. Further, unessential calls would be actually deferred because if the call-initiator is aware of the fact that the call-receiver has expressed a desired for temporary unavailability, he will drop calls that actually need not then be made. Of extreme importance also is the fact that there will consequently be less telephone tie-up from busy lines with a corresponding increase in telephone availability not now possible by conventional means.

For example, a call-receiver may easily employ our device to restrict his line for an expected incoming call, thereby reducing the chance of a conflicting call being received during this period.

Another very practical advantage which would become apparent as soon as the call-receiver acquired the habit of altering his bell signaling circuit with our device would be the avoidance of awkward telephone conversation situations. Frequently, a call-receiver is not at liberty to speak open in the presence of others. For example, a call-initiator who hears the distinctive tone signal when he places a call to a doctor is then alerted to the possibility that the doctor may be in consultation. If, nevertheless, the call is put through despite the acknowledged meaning of the distinctive tone signal, the call-initiator would at least know that the discussion should be kept brief since the doctor may not be able to enter into unrestricted conversation when others are present.

The domestic applications of our invention are similarly important. For example, a cutout of all but essential calls is very convenient when the call-receiver wishes to retire early, rest during the day, or is otherwise indisposed. The invention is also useful when there is an illness in the household, or the call-receiver is entertaining, is in private discussion or watching special events on television. Our system may also be used to indicate that the call-receiver is at home should a call-initiator make a call at a time when the call-receiver is within sound of the telephone but cannot get to it easily.

In all of these situations, the use of our device greatly lessens the reception of calls from call-initiators having messages or questions best discussed at another time because the call-initiator could interrupt only with the full knowledge that the call-receiver has someone with him or is otherwise preoccupied.

Perhaps the greatest advantage of our device is the indirect creation of greater overall business efficiency. Concomitantly, our device creates a new means to manifest courtesy in various situations of everyday living as a result of improved usage of the telephone. These advantages are less apparent than many of those enumerated above, but they result in a greater ultimate benefit to telephone users.

The telephone is a very efficient and money-saving business device when used intelligently but it can be a nuisance and crutch if used indiscriminately. Since our system indicates to the call-initiator the relative availability of the call-receiver, the call-initiator is guided in his demands upon the call-receiver. By reducing the number of interruptions during privacy periods through deferral of relatively unessential calls and the encouragement of brevity of conversation during privacy periods, the call-receiver is able to devote more of his time to productive activities. Similarly, our system increases the efficiency of the telephone to the call-initiator as well as to the call-receiver by reducing or even eliminating the time of line tie-up involved in other's screening incoming calls.

Accordingly, a primary object of our invention is the provision of an apparatus for temporarily altering the operation of telephones so as to eliminate all but absolutely essential calls.

Another object is the provision of an altered telephone system which permits a call-initiator to be apprised of the fact that the person called does not wish to be interrupted except for absolutely essential calls.

Another object is the provision of an altered telephone system whereby a call-initiator, who receives an indication that the call-receiver does not wish to be disturbed, except for essential calls, may nonetheless break through the call shutout if he allows the ringing signal to continue for some predetermined interval at the end of which time the signaling circuit is automatically restored (or, alternately, another signaling circuit is established, or both), and the call-receiver is signaled.

Another object is the provision of a telephone system in which a call-receiver's signaling device may be disconnected at will by the call-receiver for periods up to and beyond one hour.

Another object is the provision of a novel telephone system in which a circuit, such as a bell ringing circuit, may be disconnected for periods of time up to one hour or more by means of a timing device.

Another object is the provision of a novel timer for maintaining a circuit, such as a bell ringing circuit, disconnected based upon a capacitor discharge principle whereby disconnections for periods of time up to one hour or more may be maintained.

Yet another object of our invention is the provision of a restoring circuit which will permit a call-initiator to break through the call shutout set up by the call-receiver, and will automatically restore the shutout at the end of the call.

Yet another object is to provide means for altering a telephone bell signaling circuit for a predetermined period of time whereby a distinctive tone signal is generated and continuously fed back into the main telephone line to inform the call-initiator that the call-receiver's telephone bell circuit is temporarily unavailable.

A still further object is to provide a distinctive signal cut out device operable in conjunction with the aforementioned distinctive tone signal generator to shut off the distinctive tone during the regular ringing signal pulse so as to reassure the call-initiator that the call-receiver's telephone is still in operation.

Another object is to provide a distinctive tone signal interrupting device operable either alone or in conjunction with the distinctive tone signal cut out device which breaks the distinctive tone into separate pulses to further emphasize the relative unavailability of the call-receiver's telephone.

Another object is to provide a reliable small, noiseless, non-mechanical timing circuit which is not susceptible to minor outside voltage variations during the timing cycle and which provides good retrace accuracy without the necessity of an A.C. power source.

Our invention is illustrated more or less diagrammatically in the accompanying drawings, wherein.

Figure 1:
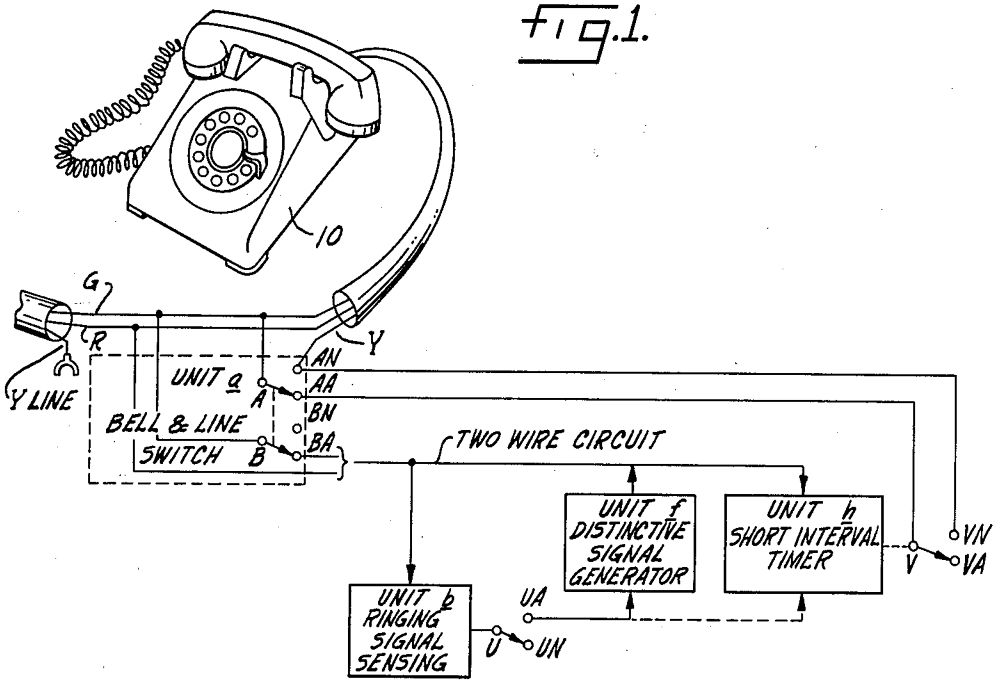
FIGURE 1 is a block schematic diagram of a system for altering a call-receiver telephone circuit to preclude reception of all calls except where, inspite of hearing a distinctive tone signal, the call-initiator allows the calling signal to continue for a predetermined length of time at the end of which the call-receiver is then signaled.

Referring now to FIGURE 1, one method of implementing our invention is shown in block form. A standard telephone instrument having a conventional bell signaling circuit has been modified so as to bring one of the bell wires Y out through the connecting cord, the other bell wire being connected within the instrument to a line wire, R. For purposes of clarity and description, we have indicated some lines with letters which may correspond to colors. For example, Y would be yellow, G green, R red and O orange. The incoming telephone line G is connected to a switch A—B which breaks the telephone bell circuit at A and AN, leaving the telephone line wires G, R, connected to the instrument, and simultaneously connects the bell circuit Y to contact AA, and the telephone line wire G to the contact designated BA. Switch A—B could be for example a toggle switch, a lever switch, or a relay which could be controlled by a timer, contained in unit *a*.

When switch A—B is in the position shown and a ringing signal is received over the incoming line, the instrument bell does not ring, but instead a ringing signal sensing unit *b*, actuates a ring relay switch U making contact at UA which turns on a distinctive tone signal generator unit *f* (and a short-interval timer, *h*). This distinctive tone signal is fed back into the line (through contacts BA, B of switch A—B, with line-wire R acting as "common"), to indicate that the receiving party's telephone bell or signaling device has been altered because he does not wish to be disturbed unless absolutely essential. In this case, the calling party may "hang-up," discontinuing the call—or may elect to interrupt at his own insistence by allowing the calling signal to continue until unit *h* closes contacts V, VN which restores the signaling circuit (approximately 30 to 45 seconds after the initial ringing pulse was received).

During the time that the bell in the base of the telephone instrument 10 has been disconnected, the normal ringing signal has continued to be received at the instrument because the line has not been effectively bridged in a manner equivalent to "answering" the telephone, and, therefore, the ring-cut-off relay at the central office has not been actuated. Consequently, when unit *h* has restored the signaling circuit at the call-receiver's telephone, the conventional ringing signal now operates the bell in the telephone 10. Answering the telephone bridges the line with a low impedance which actuates the ring-cut-off relay in the central office and the bell thereupon stops ringing. This is sensed by unit *b* which disconnects the remainder of the apparatus to await the next call.

Our system will function on the succeeding call in exactly the same manner provided switch A—B remains thrown to contacts AA and BA.

During this time, the receiving party can also make outgoing calls in the normal manner without altering the functions of the telephone.

From a functional standpoint, the operations outlined in FIGURE 1 may be implemented as follows: For example, switch A—B could be some kind of switch or relay having several contacts which is controlled by an electronic timing circuit. The user could thereby set the device in advance for a predetermined period of time in which minimum interruption was desired. At the end of that predetermined time, the telephone signaling circuit would return to normal operation even if the user forgot to restore the switching device *a* to normal operation.

Unit *b* might be a suitable relay circuit actuated by the incoming ringing signal and could include provisions for holding the relay durng standard intervals between ringing pulses. A five second delay should be adequate for example.

The distinctive tone signal generator unit *f* could consist of any apparatus capable of transmitting a distinctive tone signal over the line. For example, we might employ an electronic oscillator capable of generating a tone of sufficient strength to be readily heard from the standard busy-signal so that it is readily distinguishable. This distinctive tone signal is coupled to the line in a manner which does not draw D.C. from the line or otherwise act to bridge the line in such a way to actuate the "ring-cut-off" relay at the telephone central office. This assures that the ringing signal will continue to be received and can be used to actuate the local telephone bell or other signaling device if the call initiator elects to permit unit *h* to reestablish the signaling circuit. (The entire apparatus could be made to function if the ring-cut-off relay had been actuated, but this would require an additional suitable power circuit with which to actuate the local telephone bell when reactivated by unit *h*, and a revision of the relay holding circuit in unit *b*.)

The short interval timer unit *h* is a device which is actuated by the first incoming ringing pulse at which time it begins to measure a predetermined time interval, and at the end of which this device reestablishes the signaling circuit, providing the ringing pulses have continued to be received. Here we might employ a "large" capacitor which has been charged nearly to line voltage and which will discharge into a relay when the ringing signal begins, holding the relay closed (and the "bell circuit" disconnected) for the desired time interval. At the end of this preset interval, the relay would drop out, reestablishing the call-receiver's signaling circuit.

Figure 2:
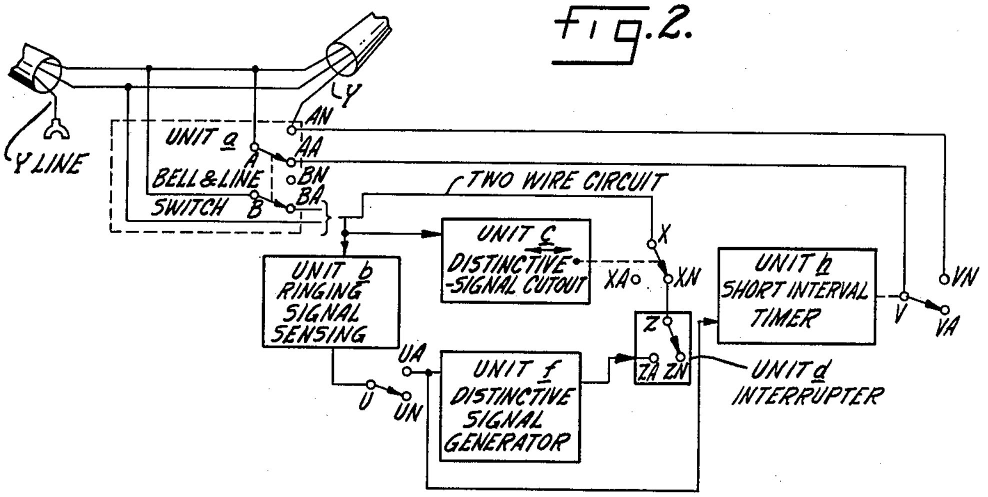
FIGURE 2 is a modification of the system shown in FIGURE 1 wherein some useful modifications have been made to augment the form of the "distinctive tone signal"

Referring now to FIGURE 2, we have shown an optional modification of our invention in which, as an additional feature, we have found it practical to transmit the distinctive, steady-tone signal frequency of unit *f* intermittently by switching it on and off by an interrupter relay circuit *d* operating at, say two or three times a second. The interruption of this distinctive tone helps to identify it as a "busy" signal. The frequency of the tone is markedly different from the conventional busy-signal and indicates to those familiar with the system that the called party does not wish to be intruded upon unless essential. The use of interrupter relay *d* permits unit *f* to be connected to the line only at intervals when relay *d* is actuated, which occurs at, say, 2 or 3 times per second.

A further optional feature illustrated in FIGURE 2 is a distinctive tone signal cutout relay unit *c* which discontinues the distinctive tone signal (originating from unit *f*) during the time in which each regular ringing pulse is received, the distinctive tone signal being sent out only between the regular ringing pulses thereby emphasizing to the call-initiator that the phone of the party called can still be signaled by the continuing ringing pulses if the calling party allows the ringing signal to continue for the established preset interval.

Figure 3A:
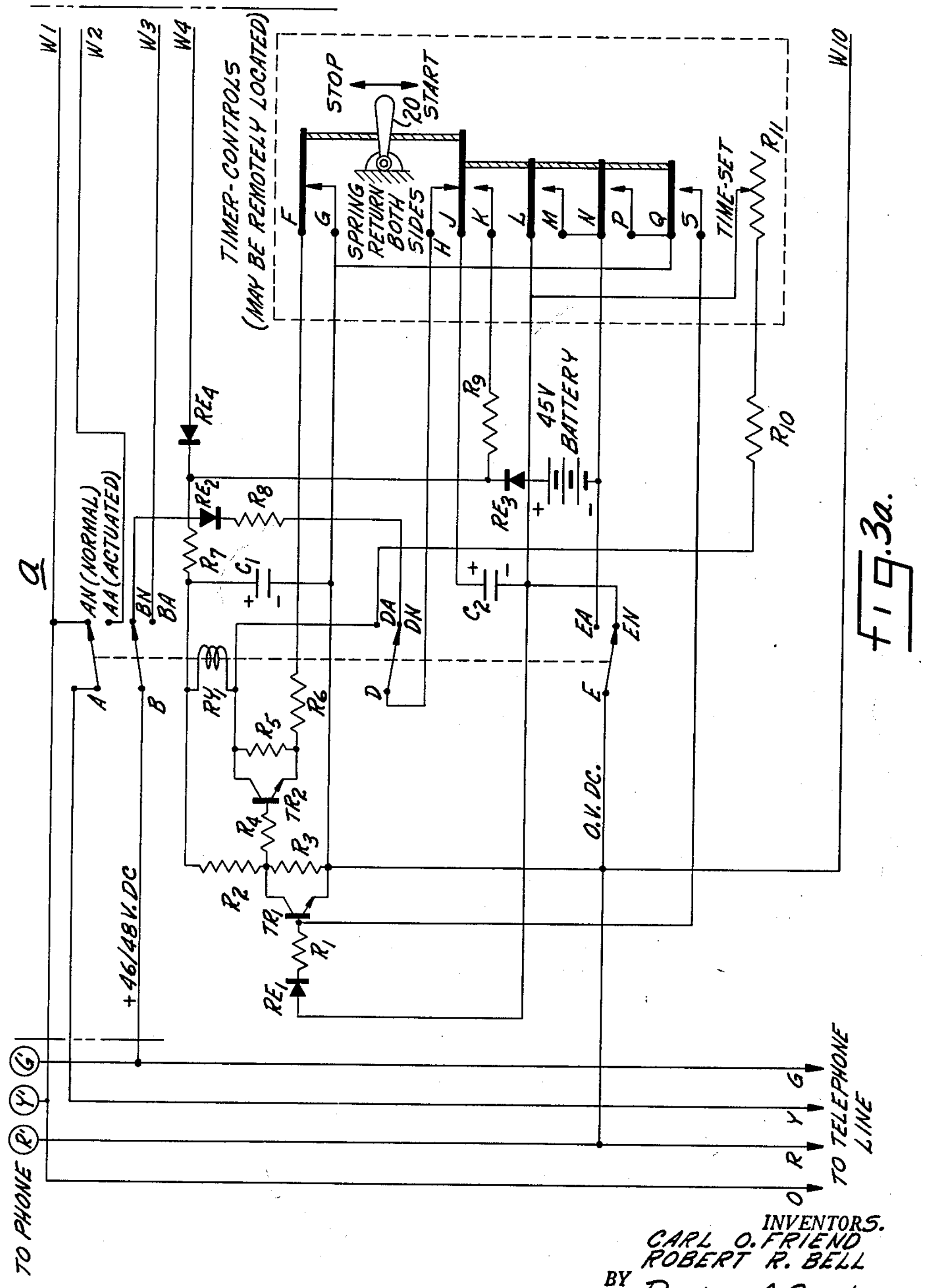
FIGURES 3*a* and 3*b* are a detailed schematic diagram of the circuits used in the systems illustrated in FIGURES 1 and 2.
Figure 3B:
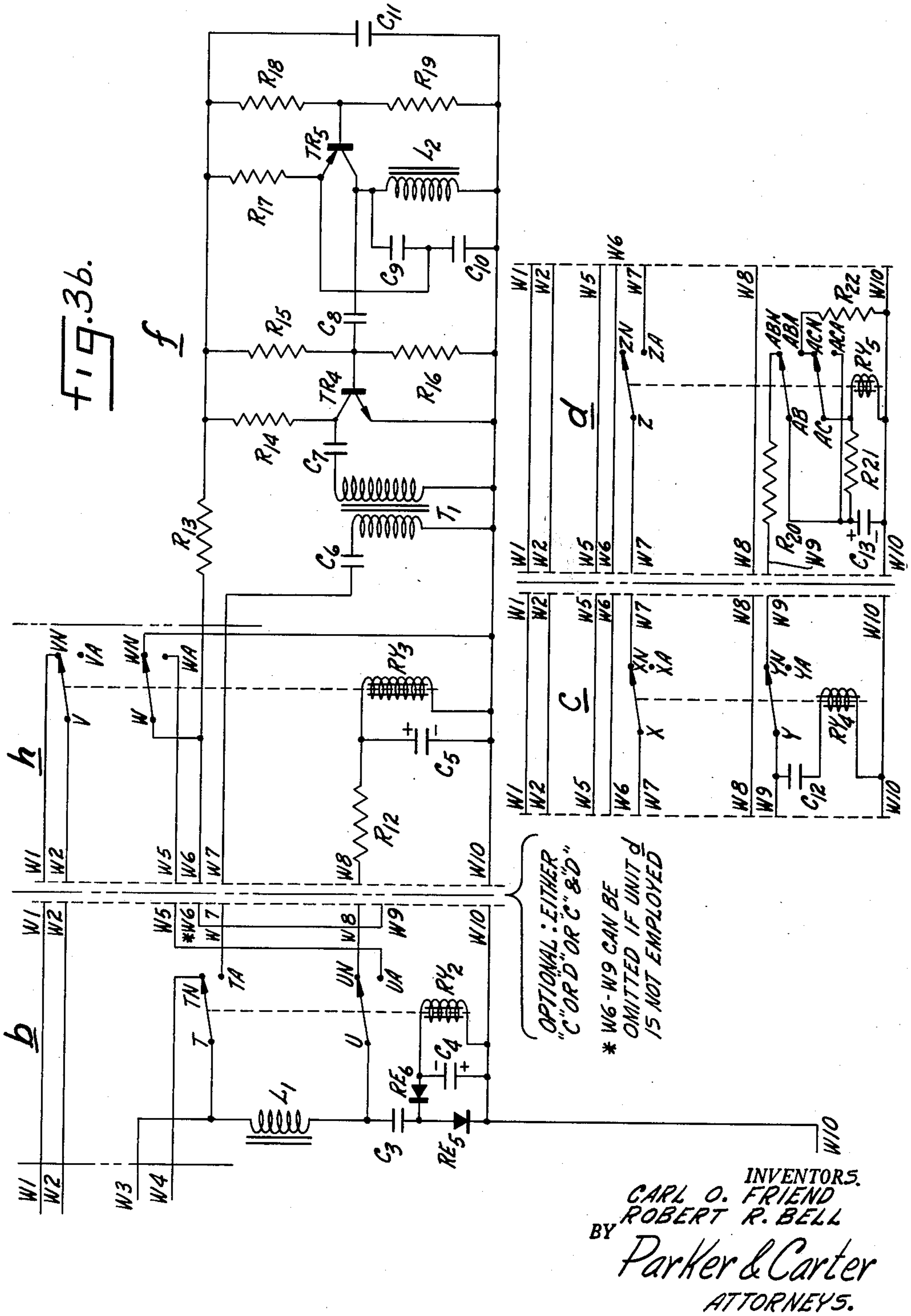

A circuit for the diagrammatic illustration of FIGURE 2 including the addition of an electronic timer circuit for controlling switch A—B is shown in FIGURES 3*a* and 3*b*. In these figures, the units of FIGURE 2 are designated across the top of the diagram in their respective positions therein. It will be understood that either, both, or neither of units *c* and *d* may be utilized. If one or both are omitted the functioning of units *h* and *f* are not otherwise affected. For convenience in reading the diagram, the base line wires have been designated $W_1$ through $W_{10}$.

*Unit a.—Timer Controlled Switching Device*

This circuit is entirely electronic, consisting of an electric relay which performs the switching function. This relay is "closed" (actuated) at the start of the timer period, and "opened" (normal) at the end of the timed period, and the timing is reliably performed, for intervals up to one hour and longer, by a unique transistorized capacitor discharge circuit which makes use of several unrelated characteristics of standard manufactured components, in proper combination, to provide unusually accurate time intervals and, at the end of the timed interval, relatively sudden collapse of the otherwise constant relay holding current. In essence, the major purpose of the relay is to disconnect the normal signaling bell circuit, contacts A, AN, for the duration of the timed interval, and simultaneously to connect the line voltage, 48 v. D.C. wire, to the remainder of the device through contacts B, BA, for use in units *a* through *h* as a power source and to provide the necessary path for the signaling functions.

The transistorized capacitor discharge timer circuit (or another type of timer circuit) unit *a* could be replaced by a switch which would set up the ringing signal shutout for as long as desired. This does not mean that the user could not be reached in any emergency, since the caller would merely have to allow the phone to ring until the automatic circuit features reestablish the ringing circuit after the predetermined time delay as provided by unit *h*. Such an expedient would make the system non-automatic to the extent that at the end of the desired privacy interval the user would have to manually restore the telephone signaling circuit to normal operation.

Capacitor $C_2$ is normally connected continuously across the 48 v. D.C. telephone line through resistor $R_8$ and crystaldiode rectifier $RE_2$ through contacts B, BN; DN, D; H, J; and EN, E. This keeps the capacitor fully charged and ready for use in the capacitor-discharge timing circuit, but more important, keeps the capacitor fully "formed" so that its internal resistance is extremely high. $R_8$ prevents capacitor $C_2$ from effectively bridging the line to A.C. ringing currents, and $RE_2$ effectively disconnects the charged capacitor from the line when the telephone is in use and line voltage drops to relatively low values, such as 5–10 volts.

When the timer starting lever 20 is depressed, capacitor $C_2$ is instead temporarily connected across the 45 volt battery through $RE_3$ and $R_9$ and contacts J, K and L, M which thereby assures a virtually uniform capacitor voltage at the start of each timing interval. $RE_3$ does not permit current to flow into the battery if the voltage on $C_2$ exceeds the battery voltage. If the capacitor has not previously been fully charged by the telephone line, as might occur if the capacitor has very recently been discharged, the battery quickly charges it through relatively low resistance $R_9$.

While the starting lever 20 is depressed, the battery is also connected across the collector and emitter of $TR_1$ by a path through $RE_3$, $R_7$, $R_2$ and contacts P, N but no significant current flows through $TR_1$ because contacts S, Q connect its base to its emitter, making $TR_1$ non-conducting. Therefore $R_3$ acts with $R_2$ as a voltage divider, keeping the voltage across $TR_1$ collector and emitter from exceeding the $V_{ce}$ breakdown rating of the transistor, and also placing $R_4$ sufficiently positive to assure that the base of $TR_2$ if positive with respect to its emitter and thus $TR_2$ is conducting. Now, when $TR_2$ is conducting—at the start of the cycle—$R_5$ is virtually short-circuited, and nearly all the available voltage appears across $RY_1$ since $R_6$ is of low value. Relay $RY_1$ is therefore also actuated by the battery at the same time, through $RE_3$, $R_7$, coil $RY_1$, $TR_2$, $R_6$ and contacts F, G, Q, P, N. Thereby, the relay

*a*. disconnects the telephone bell circuit, contacts A, AN;
*b*. connects the (48 v. D.C.) line-wire to the remainder of the apparatus, contacts B, BA;
*c*. establishes a circuit to connect (when the starting lever is released) the positive capacitor terminal of $C_2$ to the potential at the collector of $TR_2$—contacts DA, D; H, J; the negative capacitor terminal being permanently connected to the base of $TR_1$ through $RE_1$ and $R_1$; and
*d*. holds the negative battery terminal connected to the "0 v. D.C." line as long as the relay is closed (contacts EA, E; which parallel contacts N, P).

When the starting lever 20 is released, contacts Q, S open, removing the "short-circuit" between the base and emitter of $TR_1$, and contacts H, J close, $C_2$ thereby placing the anode of $RE_1$ at 45 v. negative potential with respect to the "lower" end of $RY_1$ by means of a path through contacts DA, D (which is positive with respect to the emitter of $TR_1$ by the value of the drop across $R_6$ plus that across "conducting" $TR_2$). The resulting voltage drop across the high back-resistance of non-conducting $RE_1$ and the high base-emitter resistance of non-conducting $TR_1$ holds the base negative with respect to the emitter, and therefore $TR_1$ remains non-conducting and $RY_1$ remains closed.

$C_2$ is now shunted by $R_{10}$ and $R_{11}$ in series, but effectively isolated from the remainder of the circuit by the very high back-resistance of silicon diode $RE_1$ plus the relatively high base-emitter "back resistance" of reverse-biased non-conducting $TR_1$ transistor. Thus, effectively, $C_2$ discharges through timer resistances $R_{10}$ plus $R_{11}$, and the latter can be calibrated almost linearly in intervals of time. If the positive terminal of $C_2$ were set at $TR_1$ emitter potential, $TR_1$ would never become sufficiently conducting to develop a voltage drop through $R_2$ which would shut off $TR_2$ and open relay $RY_1$, since the base of $TR_1$ must be made positive with respect to its emitter potential to cause $TR_1$ conduction. Even then, because the flow of a minute base current through $RE_1$ results in a voltage drop which tends to bias the base negatively, the positive terminal of $C_2$ must be anywhere from 3 or 4 volts positive, or more, with respect to $TR_1$ emitter potential, to assure relay dropout when the capacitor $C_2$ is virtually discharged. This is assured since $C_2$ is connected to contact DA which is positive with respect to $TR_1$ emitter potential by the amount of voltage drop across $R_6$ and conducting $TR_2$.

As capacitor $C_2$ becomes nearly discharged and $TR_1$ base potential rises toward and above emitter potential, and also as a result of the current amplification of $TR_1$, the last several seconds of capacitor $C_2$ discharge result in fairly rapid increasing voltage drop through $R_2$. Because of the amplification of $TR_2$, as its base potential drops to its emitter potential, the relay holding current is even more suddenly cut-off. Since, at the instant the current through $RY_1$ starts to diminish, the voltage drop across the coil of $RY_1$ is reduced accordingly, therefore the positive terminal of $C_2$ is pulled further positive, which pulls the negative terminal along similarly ($C_2$ is of very large capacity) causing the base of $TR_1$ to be correspondingly "jerked" in a positive direction, resulting in virtually instantaneous conduction of $TR_1$, and simultaneous non-conduction of $TR_2$, which opens $RY_1$ instantly. Thus, even after intervals of one hour, the time required for delay of full relay holding current may be measured in milliseconds. Therefore, there is no danger of jarring the timing relay open near the end of the time period, since the holding current does not decrease as the capacitor voltage decreases, and the timer circuit is substantially immune to electrical and mechanical disturbances. It is virtually free from wear since the only moving parts are the start-stop lever switch, the relay contacts and armature which act only at the start and the end of the timed interval, and the timeset potentiometer which need not be moved at all, until a different time interval is desired.

When $TR_2$ stops conducting at the moment ending the timing cycle, caused by $TR_1$ starting to conduct, $R_5$ and $R_6$ act with the D.C. resistance of $RY_1$ as a voltage divider, the voltage on $RY_1$ falling below its drop-out value, with $R_5$ assuring that $V_{ce}$ of $TR_2$ is not exceeded, and $R_6$ providing just enough $TR_2$ emitter bias so that a "conducting" $TR_1$—which virtually short circuits $R_3$—will place the base of $TR_2$, through $R_4$, sufficiently negative with respect to the $TR_2$ emitter to assure its "non-conduction."

As a further refinement, in unit *b*, the 48 v. D.C. line potential is connected through B, BA to T, TN to $RE_4$, and since $RE_4$ is therefore slightly positive with respect to $RE_3$, the latter becomes non-conducting, and the telephone line supplies the approximately 3 milliampere relay holding current through $RE_4$. This small current drain causes line voltage to drop to about 45½–46 volts. $RE_3$ protects the battery from small reverse currents which would quickly ruin it, and also assures that even if the line voltage drops further, through use of the telephone or otherwise, the timer will continue to function and the voltage variations across the timing circuit will be negligible. (Battery drain in normal operation over any considerable period of time is therefore exceedingly small and battery life correspondingly greately extended.) $C_1$ further stabilizes the timing circuit voltage.

Should it be desired to inactivate the timer before the preset time has elapsed, thereby re-establishing the normal telehpone signaling function, it is only necessary to move the lever switch 20 to the "stop" position momentarily, for this opens contacts F, G breaking the relay coil circuit, and the relay drops out thus opening contacts B, BA which had supplied relay holding current from the line through contacts T, TN. Contacts EA, E are also opened and this disconnects the battery so it will not continue to supply current to any of the associated circuitry, for this would also shorten its life.

*Unit b.—Ringing Signal Sensing*

Capacitor $C_3$ is intended to couple A.C. ringing signals to a relay circuit which involves $RY_2$, and to isolate this relay circuit from D.C. line potential so no D.C. load will be placed on the line. When the timer relay $RY_1$ is closed, capacitor $C_3$ is charged to line voltage (now about 46 v. D.C.) through contacts BA and $L_1$ and $RE_5$. When an incoming ringing pulse is received (generally about 32 v. A.C. superimposed upon about 46 v. D.C. for a duration of about 2 seconds), the line voltage varies from about 0 v. instantaneous potential to about 90 v., instantaneous (and vice versa) at ringing signal frequency, as measured "above" the 0 volt D.C. line.

Assuming, at any given instant, that the line voltage is increasing to 90 v., capacitor $C_3$ is being charged to nearly this potential, since $RE_5$ is conducting, and the resistance drop through $L_1$ is small and its reactance nearly as low at ringing frequency. As line voltage decreases from 90 C., the nominal 90 v. charge on $C_3$ places its negative terminal at a potential negative to the "0 v. D.C." line wire, and $RE_5$ ceases to conduct. Since the cathode of $RE_6$ is thereby being made negative with respect to the 0 v. D.C. line, to which its anode is connected by the low impedance of $C_4$, $RE_6$ begins to conduct and to charge $C_4$ from the charge contained in $C_3$. This $C_4$ charge accummulates to about 50 volts in 2 seconds. Relay $RY_2$ closes at 12 volts, or about ½ second after the first ringing pulse begins, and the large capacity of $C_4$ holds this relay closed for about 5 seconds until the next pulse is received. Thus, relay $RY_2$ closes virtually at the start of the first pulse of the ringing signal and stays closed until the ringing signal has ceased (the latter being caused by either the call-initiator "hanging-up" to discontinue his call, or by the call-receiver lifting his handset from the cradle which bridges the line and actuates the ring-cut out relay at the central office), thereby assuring for the identical duration of time that contacts T, TA and U, UA remain closed to carry out the other functions of the device. Contacts T, TA feed any outgoing distinctive tone signal to the telephone line; inductane $L_1$ prevents capacitance $C_3$ from short-circuiting this signal, since its inductive reactance to this signal frequency is several thousand ohms. ($L_1$ also serves this function for the other components in optional units *c*, *d*, which may be connected to terminal UA.)

*Unit c.—Busy-Signal Cutout During Ringing Pulse*

The previously mentioned function of this optional unit is to discontinue the distinctive tone signal during the interval in which the incoming ringing pulse is being received, on the assumption that this may be of additional value in emphasizing to the call-initiator that the ringing signal has not been discontinued, and, therefore, not withstanding the distinctive-tone signal, the called party could still answer the call if his bell were made to ring.

As shown in FIGURES 3*a* and 3*b*, unit *c* consists of a capacitor for coupling A.C. relay $RY_4$ to the line through contacts W, WA; UA, U; BA, B. Capacitor $C_{12}$ prevents the relay from presenting a D.C. load to the line, but passes ringing current to actuate $RY_4$, which "opens" at the end of each ringing pulse, thus reestablishing the output circuit of the busy signal circuit through contacts XN, N. If unit *d* is incorporated in the device, contacts YN, Y also reestablish its operating voltage between ringing pulses, resulting in the interrupted busy-signal discussed below under "unit *d*."

*Unit d.—Interrupter*

Between ringing pulses 46 v. D.C. is applied through $R_{20}$ to $C_{13}$ which charges until D.C. relay $RY_5$ closes, disconnecting contacts AB, ABN and removing the charging current. When sufficient charge on $C_{13}$ has been dissipated, $RY_4$ opens, and the cycle is ready to repeat itself. A snap action is desirable and one way of providing this for all $RY_5$ contacts is as follows.

When $RY_5$ contacts are "open," resistors $R_{20}$, $R_{21}$, and $R_{22}$ (the latter in parallel with the coil of $RY_5$) act as a voltage divider across the available D.C. line voltage to provide slightly more than minimum pull-in voltage to the coil of $RY_5$ (after capacitor $C_{13}$ has charged up to maximum voltage through $R_{20}$). At this point the relay armature begins to pull-in, and contacts AC, ACN disconnect $R_{22}$ which was in shunt with the coil of $RY_5$ so, at this instant, the available capacitor voltage is now distributed across $R_{21}$ and the coil of $RY_5$ alone (as is the component of D.C. line voltage impressed through $R_{20}$), resulting in a suddent increase of voltage across the coil of $RY_5$ thus further opening contact AB, ABN by a definitely increased pull of the armature, which there fore continues to "close" the relay even though contacts AB, ABN have disconnected the charging current to the capacitor. When the armature has pulled-in further, contacts AC, ACA short-circuit $R_{21}$, placing full available capacitor voltage across the coil of $RY_5$, assuring complete pull-in. Contacts AB, ABA place $R_{22}$ in shunt across $C_{13}$ (in parallel with the coil of $RY_5$) hastening its discharge down to the relay drop-out voltage. This is desirable since the relay should otherwise remain closed much longer than it was open. When the relay begins to drop out, contacts AC, ACA open, placing $R_{21}$ in series with the coil of $RY_5$, thus further reducing the voltage across the coil, and speeding the drop out action. When the armature is further opened, contacts AC, ACN connect $R_{22}$ in shunt across the relay coil, assuring its complete drop-out. At this point, contacts AB, ABN reconnect the D.C. line voltage and $C_{13}$ begins to recharge, and the cycle repeats itself. (It is desirable, though not essential, to see that contacts AC, ACN open slightly before AB, ABN.) This snap action of the electrical contacts prevents the armature from idling at a midway position where contacts AB, ABN are touching with a high resistance contact which reduces the coil current and stops the armature from moving further. By simultaneously adjusting $R_{21}$ for the time the relay remains open, and $R_{22}$ for the time it remains closed, the intermittent action of $RY_5$ may be "shaped" to a uniform open-closed sequence which, by then adjusting $C_{13}$, can be made to recur at a rate of about 2 cycles per second. When $RY_5$ is closed, contacts Z, ZA connect the distinctive tone signal (generated by unit *f*) to the telephone line through (XN, X), TA, T and BA, B.

Resistance $R_{20}$ not only limits the charging current to $C_{13}$ but, by being in series with $C_{13}$ across the line, prevents $C_{13}$ from effectively "short-circuiting" any ringing voltages which may be impressed on it. This requirement helps determine the minimum value of $R_{20}$. This in turn affects the choice of value for $C_{13}$, to obtain the desired timing action. Approximate values, once determined, are not critical. Standard parts can be used for all components, with $R_{21}$ varied slightly for desired interruption rate at time of assembly.

*Unit h.—Short Interval Timer*

When unit *a* is switched on, capacitor $C_5$ charges through $R_{12}$ and contacts UN, U and BA, B to about 80% of line voltage as determined by the voltage divider relationship of $R_{12}$ and the resistance of relay coil $RY_3$. (Resistance of $L_1$ in series is relatively small.) This voltage is more than that required to actuate $RY_3$, thus disconnecting the call-receiver's signaling circuit at VN, V. When a ringing pulse is received, $RY_2$ closes, as has been explained, and this breaks the $RY_3$ holding current but capacitor $C_5$ begins to discharge through $RY_3$, holding it closed until drop-out voltage is reached. This requires about 30–40 seconds. When $RY_3$ drops out, the signaling circuit is reestablished by contacts V, VN, and the input power to units *f*, *c* and *d*, which generate and modify the distinctive tone signal, is broken at WA, W. (Contacts WN, W discharge capacitor $C_{11}$ through $R_{13}$, thereby causing a rapid decay in the distinctive tone signal generated by unit *f*, which is discussed below.) Resistor $R_{12}$ serves a dual purpose in that it not only limits the charging rate of $C_5$ so that it does not unduly load the line when charging, but also prevents it from "short-circuiting" any portion of the initial ringing pulse which might be impressed on it before $RY_{12}$ pulls-in.

*Unit f.—Distinctive Signal Generator*

When $RY_2$ closes upon receiving the first pulse of an incoming ringing signal, line voltage is applied through U, UA; WA, W; and $R_{13}$, through which the current drawn by unit *f* causes the voltage to drop to 24 v. D.C., and this voltage is applied to decoupling capacitor $C_{11}$ whose large capacity maintains a relatively stable D.C. voltage even when "A.C. plus D.C." ringing pulses are introduced to the input of $R_{13}$.

$TR_5$ oscillates in what would be called a Colpitts type circuit, $C_9$ and $C_{10}$ being proportioned to supply the feedback, and their series capacitance tuning $L_2$. The output is fed through $C_8$ to transistor amplifier stage $TR_4$ and the output of this stage through $C_7$ to the impedance-matching output transformer $T_1$, which is coupled to the line through $C_6$. (This coupling proceeds through ZA, Z; XN, X; TA, T; and BA, B when the intermittent distinctive tone signal is being generated, the interrupting being performed by contacts ZA, Z.) The signal level on the line is about 2 v. R.M.S. equivalent, at a frequency of about 900 c.p.s.

Output capacitor $C_6$ serves several functions. It does not pass D.C., and therefore does not permit the output winding of $T_1$ to bridge the line and operate the ring-cut-off relay at the central office. So, neither does this winding cause reduction of the line voltage which is being used as a D.C. power source. The relatively low value of $C_6$ offers a reactance of several thousand ohms to ringing currents, and therefore has negligible effect in this respect. Yet, it offers sufficiently low impedance to the distinctive tone signal generated in unit *f*—coupling it to the line satisfactorily.

The total D.C. load on the line, for operating all the relays and the transistor circuits which may be in use at any one time, is so low that the central-office ring-cut-off relay is not actuated, permitting later use of the continuing ringing signal for ringing the local signaling-bell.

While we have shown and described one embodiment including serveral optional features of our invention, it will be understood that the diagrammatic and schematic illustrations and description of operation is intended to be illustrative only and the scope of the invention should be limited only by the scope of the hereinafter appended claims.

For example, as an alternate means of closing the ring relay switch U, a shaded-pole A.C. relay coil which is sufficient to hold the switch operative between ringing pulses could be employed. The coil could be fed A.C. ringing voltage from the line through a series isolating capacitor.

We claim:

1. In a telephone circuit having a pair of line wires and a primary bell signaling circuit including a pair of bell wires, one of the bell wires being connected to one of the line wires, a first switch, said first switch being operable to simultaneously disconnect the one bell wire from the one line wire and to connect a distinctive tone signal generator unit across the line wires, said unit including an incoming ringing signal sensing device having a ring relay switch, a distinctive tone signal generator, said ring relay switch being operable, in response to a sensed incoming ringing signal, to connect the distinctive tone signal generator across the line wires, said distinctive tone signal generator being operable to generate a distinctive tone signal while incoming ringing signals continue to be received, means for transmitting the generated tone signal to the line wires, a short interval timer, a bell circuit restoring switch between the one bell wire and the one line wire, said short interval timer being operable to actuate the bell circuit restoring switch at the termination of its timed interval provided incoming ringing signals continue to be received to thereby complete a secondary signaling circuit across the line wires and to simultaneously disconnect the distinctive tone signal generator, said secondary signaling circuit being maintained across the line wires only as long as ringing signal pulses continue to be received, holding means for maintaining the first switch in its actuated position connecting the distinctive tone generator unit across the line wires for pre-selected time intervals, said switch being coil actuated and including a holding capacitor normally connected continuously across the line wires, a battery, means for momentarily connecting the capacitor across the battery instead of line voltage to thereby assure a virtually uniform capacitor voltage at the start of each timed interval, a relay coil for actuating the first switch, means for connecting the relay coil across the battery, a variable resistance in series parallel with the capacitor which controls the relay coil, the value of the variable resistance being proportional to calibrated time intervals, and means for maintaining virtually constant voltage across the relay coil and then quickly de-energizing the relay coil at the end of the pre-selected capacitor discharge timed interval.

2. The telephone circuit of claim 1 further characterized in that the ring relay switch is coil operated, said coil being actuated and held operative during and between incoming ringing-signal pulses by the accumulated charge on a primary capacitor connected across the coil, said charge originating and being intermittently replenished by rectification of incoming ringing-signal pulses received through a secondary D.C.-isolating capacitor.

3. In a telephone system having a call initiating station and a primary signaling circuit at a substation, said primary signaling circuit including a line, first switch means for alternately making and breaking the primary signaling circuit by connecting and disconnecting a line in the primary signaling circuit from the substation, means for generating an incoming ringing signal, an incoming ringing signal sensing device operable to sense an incoming ringing signal when the first means has disconnected the primary signaling circuit from the substation, a distinctive tone signal generating means operable to generate a distinctive tone signal in response to an incoming ringing signal as sensed by the incoming ringing signal sensing means, means for transmitting the distinctive tone signal to the call initiating station only while incoming ringing signals continue to be received, means for disconnecting the distinctive tone signal generating means and establishing an alternate signaling circuit at the end of a pre-determined time interval measured from the start of each received call, said alternate signaling circuit being operable to transmit ringing signals to the substation, a distinctive tone signal interrupting means operable to intermittently interrupt the generated distinctive tone signal, and means for disconnecting the distinctive tone signal during that time interval during which the standard ringing signal pulse is received.

4. In a telephone system having a call initiating station and a primary signaling circuit at a substation, said primary signaling circuit including a line, first means for alternately making and breaking the primary signaling circuit by connecting and disconnecting a line in the primary signaling circuit from the substation, means for generating an incoming ringing signal, an incoming ringing signal sensing device operable to sense an incoming ringing signal when the first means has disconnected the primary signaling circuit from the substation, a distinctive tone signal generating means operable to generate a distinctive tone signal in response to an incoming ringing signal as sensed by the incoming ringing signal sensing means, means for transmitting the distinctive tone signal to the call initiating station only while incoming ringing signals continue to be received and means for disconnecting the distinctive tone signal during that time interval during which the standard ringing signal pulse is received.

References Cited in the file of this patent

UNITED STATES PATENTS

| | | |
|---|---|---|
| 2,481,840 | Hardgrave | Sept. 13, 1949 |
| 2,715,161 | Lutz | Aug. 9, 1955 |
| 2,830,235 | Leonard | Apr. 8, 1958 |
| 2,892,133 | Huge | June 23, 1959 |